United States Patent [11] 3,593,668

| | | | |
|---|---|---|---|
| [72] | Inventor | George J. Adams Santa Monica, Calif. | |
| [21] | Appl. No. | 844,566 | |
| [22] | Filed | July 24, 1969 | |
| [45] | Patented | July 20, 1971 | |
| [73] | Assignee | Stanray Corporation Chicago, Ill. | |

[54] STATIC SWITCH
2 Claims, 7 Drawing Figs.

[52] U.S. Cl.................................................. 104/130, 104/105
[51] Int. Cl.................................................. E01b 7/12, B61b 13/04, F01b 23/06
[50] Field of Search........................................... 104/105, 130

[56] References Cited
UNITED STATES PATENTS
3,451,351   6/1969   Hawes.................. 104/130

*Primary Examiner*—Arthur L. La Point
*Assistant Examiner*—D. W. Keen
*Attorney*—Sabin C. Bronson

ABSTRACT: A switching system for a vehicle requiring no moving parts in the road bed or track. A pair of channels positioned at the switch to provide vehicle guidance along the main line and the diverging line, respectively. Guide wheels in the vehicle engaging the track for guidance during normal operation, and auxiliary wheels in the vehicle for use at the switching area for selectively engaging one of the track channels.

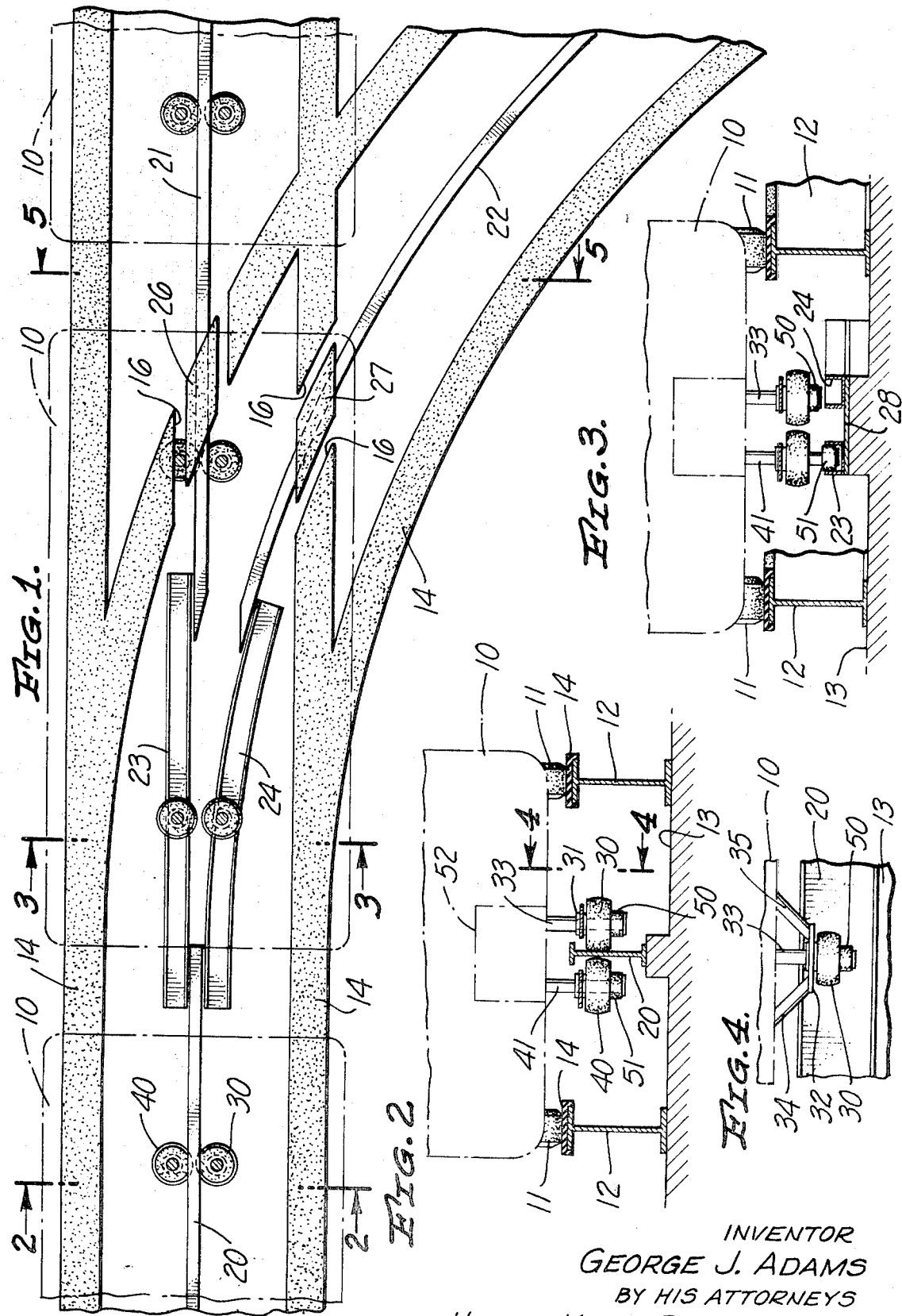

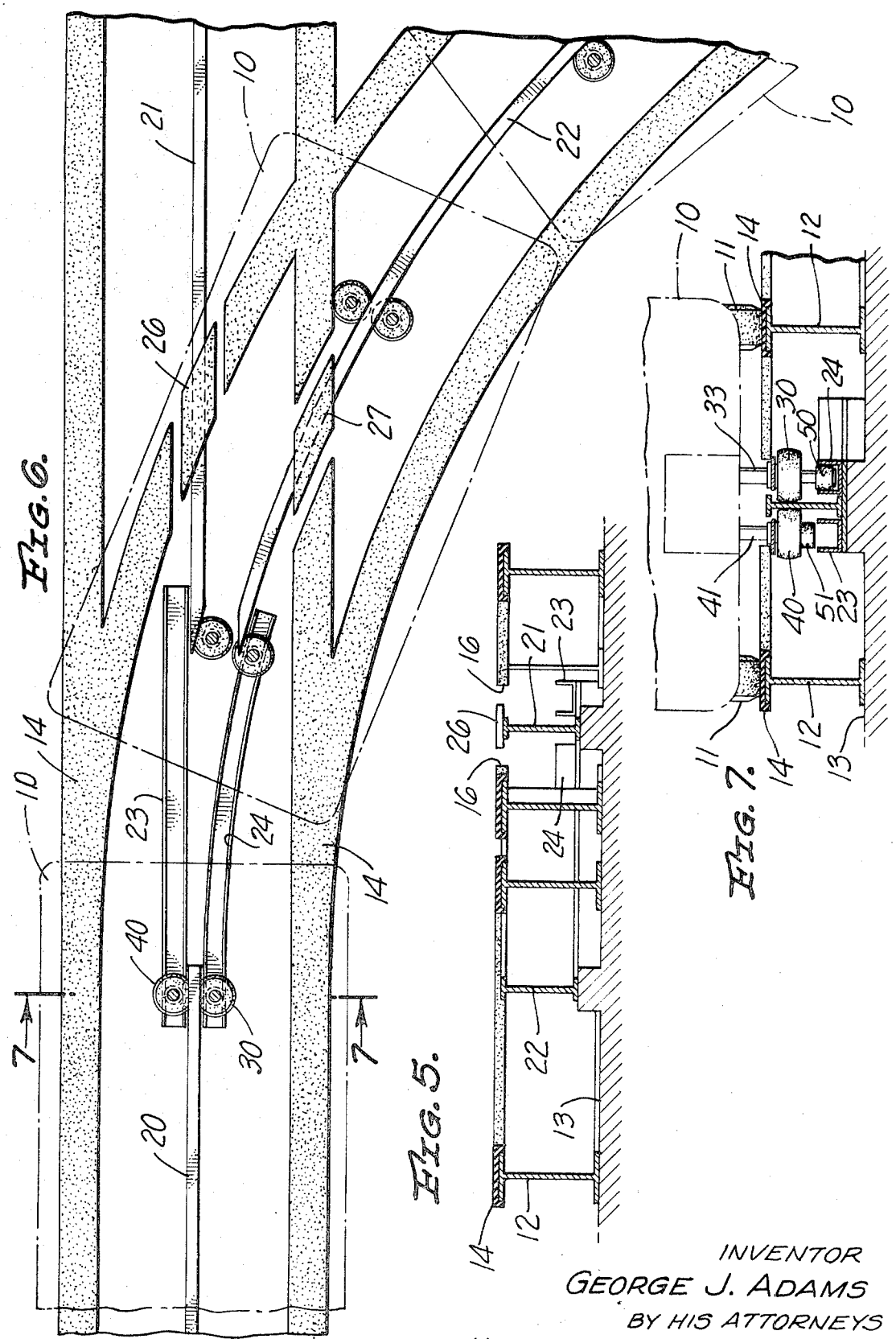

STATIC SWITCH

This invention relates to a vehicle switching system and will be described herein in conjunction with a four wheel vehicle running on tracks or rails. However, the switching system of the invention is equally applicable to a wide variety of vehicles which utilize a central guide system.

Many different types of switches have been developed and utilized in the past and most of them utilize some arrangement of moving parts in the track or roadbed. It is an object of the present invention to provide a new and improved switching system which does not utilize any moving parts in the track or guide rail, i.e., a static switch. A further object is to provide such a switching system which can utilize conventional structural shapes, such as I-beams and channels, for the guide members in the track or roadbed.

It is an object of the invention to provide a switching system wherein the direction selection is accomplished by actuation of guide means, typically one or more wheels or rollers, carried in the moving vehicle. The direction selection operation can be manual or mechanically or electrically actuated and can be automatic in response to control signals or can be under the control of an operator in the vehicle.

The switching system comprises in general a pair of guide members disposed in generally side-by-side relation at the switching zone and providing for guidance along the two possible directions, and control wheels carried in the vehicle for selectively engaging the guide members.

Other objects, advantages, features and results will more fully appear in the course of the following description. The drawings merely show and the description merely describes a preferred embodiment of the present invention which is given by way of illustration or example.

In the drawings, FIG. 1 is a top plan view of a road bed incorporating a preferred embodiment of the switching system of the invention and showing a vehicle in phantom lines moving along the straight line of the switch;

FIG. 2 is a sectional view taken along the line 2-2 of FIG. 1;

FIG. 3 is a sectional view taken along the line 3-3 of FIG. 1;

FIG. 4 is a partial sectional view taken along the line 4-4 of FIG. 2;

FIG. 5 is a sectional view taken along the line 5-5 of FIG. 1;

FIG. 6 is a view similar to that of FIG. 1 showing the vehicle moving along the diverging line; and FIG. 7 is a sectional view taken along the line 7-7 of FIG. 6.

The drawings illustrate a vehicle 10 with wheels 11 running on a roadbed consisting of I-beams 12 resting on a support 13 and having a surface coating 14 on the upper surface of the I-beams 12. The I-beams which provide the tracks for the support wheels 11 of the vehicle 10 are disposed as seen in FIG. 1 to provide both straight ahead and divergent traffic patterns. Gaps 16 in the I-beams provide clearance for the guide and auxiliary wheels of the vehicle, which will be described below.

While a particular arrangement of support wheels for the vehicles and a particular arrangement of track or roadbed are described and illustrated, it will be recognized that a wide variety of support arrangements and track arrangements can be utilized with the switching system of the invention.

The switching system includes a guide member 20 positioned upstream from the switching zone, another guide member 21 positioned downstream of the switching zone along one possible path, and another guide member 22 positioned downstream of the switching zone along the other possible path. Guide members 23 and 24 are positioned at the switching zone, in generally side-by-side arrangement. In the preferred embodiment illustrated, the guide members 20, 21 and 22 comprise vertically positioned I-beams resting on the base 13, as best seen in FIGS. 2 and 5. A plate 26 may be carried on the guide member 21 and a similar plate 27 may be carried on the guide member 22 (FIGS. 1 and 5) to provide roadbed surface at the gaps 16.

In the preferred embodiment illustrated in the drawings, the guide members 23, 24 are formed of upwardly opening channels mounted on a plate 28 supported on the base 13. The channel member 23 extends between the member 20 and the member 21, while the channel member 24 extends between the member 20 and the member 22.

The vehicle 10 carries guide wheels for engaging the guide members 20, 21 and 22, and auxiliary wheels for engaging the guide members 23, 24. Typically the vehicle will utilize two sets of the wheels disposed in fore-and-aft relation along the vehicle.

The preferred embodiment for the guide wheels is best seen in FIGS. 2 and 4. A wheel 30 is mounted on a hub 31. The hub rotates in an opening in a support plate 32 and the wheel and hub together rotate on a shaft 33. The plate 32 is supported from the vehicle on struts 34, 35. The wheel 30 is maintained fixed in the vertical position by engagement of the hub 31 with the plate 32. Another wheel 40 is similarly mounted on a shaft 41.

The wheels 30, 40 are spaced laterally to provide room for the guide members 20, 21, 22. As the vehicle moves along the roadbed, engagement of the wheels 30, 40, with the guide members provide the desired guidance for the vehicle, except at the switching zone.

Each wheel assembly includes auxiliary wheels 50, 51 carried on the lower ends of the shafts 30, 41, respectively. A mechanism 52 is provided in the vehicle for lowering and raising the shafts 33, 41. Both shafts are shown in the normal upper position in FIG. 2, with the shaft 41 in the lower position in FIG. 3 and with the shaft 33 in the lower position in FIG. 7. Any suitable arrangement may be utilized for the mechanism 52 for lowering and raising the shafts 33, 41. Typically this may comprise a handcrank or a motor-driven rack and pinion or an electromagnetic solenoid.

The auxiliary wheels 50, 51 are disposed on the vehicle so that they normally clear the guide members 23, 24. When the vehicle approaches the switching zone, one of the auxiliary wheels is lowered. Consider the situation when the vehicle is to continue along the straight line from the guide member 20 to the guide member 21. The auxiliary wheel 51 is lowered and engages the channel guide member 23 as the vehicle moves from the area of section line 2-2 to the area of section line 3-3. As the vehicle passes through the switching zone, the auxiliary wheel 51 takes over the guiding function from the guide wheels 30, 40. After leaving the switching zone, the guide wheels 30, 40 engage the guide member 21 and the vehicle continues in the usual manner. The auxiliary wheel 51 is then raised to the normal position.

A similar operation occurs when the vehicle is to take the diverging path, as illustrated in FIG. 6. Here the auxiliary wheel 50 is lowered and engages the channel guide member 24. This engagement guides the vehicle from the time the guide wheels 30, 40 leave the guide member 20 until they engage the guide member 22.

In operation, the auxiliary wheels could be selectively moved from the position of FIG. 3 to the position of FIG. 7 as desired, without having both wheels retracted to the position of FIG. 2. However, the fully retracted condition of FIG. 2 provides additional clearance and is the preferred mode of operation.

The vehicle switching system provides a simple and accurate guidance for the vehicle while using no moving parts in the track or roadbed. The system is readily fabricated from conventional steel sections, requiring only I-beams, channels and plates.

I claim:

1. In a vehicle switching system for directing a vehicle from a first point to a selected one of second and third points, the combination of:

a first vehicle guide member leading from said first point;

a second vehicle guide member leading to said second point;

a third vehicle guide member leading to said third point;

said first, second and third guide members comprising vertical plates;
a fourth vehicle guide member disposed between said first and second guide members;
a fifth vehicle guide member disposed between said first and third guide members;
said fourth and fifth guide members comprising channel members disposed in generally side-by-side relation;
guide wheel means on a vehicle for engaging said first, second and third guide members in vehicle guiding relation as the vehicle moves along the respective guide members;
said guide wheel means including a pair of wheels spaced apart for engaging opposite sides of said plates;
auxiliary wheel means on the vehicle and movable between a first position engaging said fourth guide member in vehicle guiding relation, and a second position engaging said fifth guide member in vehicle guiding relation, for selectively guiding the vehicle to said second and third guide members;
each guide wheel mounted coaxially with an auxiliary wheel;
said auxiliary wheel means including a pair of auxiliary wheels each movable vertically with respect to the vehicle to engage a different selected one of said channel members.

2. A switching system as defined in claim 1 in which the auxiliary wheel is movable with respect to its coaxially mounted guide wheel along the axis of rotation of the wheels toward and away from the guide wheel.